United States Patent [19]
Yang

[11] Patent Number: 5,894,331
[45] Date of Patent: Apr. 13, 1999

[54] METHOD OF CHECKING SLEEP MODE FUNCTION IN A TV

[75] Inventor: Dongha Yang, Kyungki-Do, Rep. of Korea

[73] Assignee: LG Electronics Inc., Seoul, Rep. of Korea

[21] Appl. No.: 08/651,555

[22] Filed: May 22, 1996

[30] Foreign Application Priority Data

Jun. 13, 1995 [KR] Rep. of Korea ............... 95-15611

[51] Int. Cl.$^6$ ............... H04N 9/74; H04N 5/44; H04N 3/223
[52] U.S. Cl. ............... 348/730; 348/10; 348/581
[58] Field of Search ............... 340/825.25, 309.15; 358/182, 21, 183, 194.1; 368/734; 386/46, 83; 348/460, 730

[56] References Cited

U.S. PATENT DOCUMENTS 4,626,892  12/1986  Nortup et al. ............... 358/21
4,821,102  4/1989   Ichikawa et al. ............... 358/182
5,153,580  10/1992  Pollack ............... 340/825.25
5,195,951  3/1993   Hailey et al. ............... 358/182

FOREIGN PATENT DOCUMENTS 0 437 833  7/1991  European Pat. Off. .

Primary Examiner—John K. Peng
Assistant Examiner—Dinh Chu
Attorney, Agent, or Firm—Morgan, Lewis & Bockius LLP

[57] ABSTRACT

A method of checking sleep mode function in a TV, and in particular an improved method of checking a sleep mode function in a TV which is capable of turning off power when there is no response to a message outputted for confirming a viewer's continued viewing at periodic intervals when a set sleep mode time is reached, includes confirming whether a set sleep mode time is reached, outputting a message to be displayed on the screen for confirming the viewer's continued viewing at every predetermined interval of time when the set sleep mode time is reached, and confirming a response to the message from the viewer and turning off power when there is no response to the message from the viewer.

4 Claims, 2 Drawing Sheets

METHOD OF CHECKING SLEEP MODE FUNCTION IN A TV

BACKGROUND OF THE INVENTION

1. Field of the Invention

The present invention relates to a method of checking sleep mode function in a TV, and in particular to an improved method of checking sleep mode function in a TV which is capable of turning off power when there is no response to a message prompting a viewer for confirming whether a continued viewing is desired after a predetermined time when a set sleep mode time is reached.

2. Description of the Prior Art

In general, a power-off-time function is provided in a TV and the like such as a television or a video cassette tape recorder (VCR) so as to prevent wasting of power by the apparatus when a viewer falls asleep while watching television.

A viewer can take advantage of the power-off-time function of a TV and the like at midnight, or at a time when a viewer easily falls asleep.

When a viewer falls asleep while watching a program with a sleep mode set in a TV or the like, and then a set sleep mode time, i.e. the predetermined time is reached (the predetermined time when power is to be turned off), power to the device is automatically turned off, and thereby the wasting of power and the shortening of durability caused by an unnecessary operation can be prevented.

However, in today's society, people are stressed and tired due to work, and often fall asleep while watching TV, but usually set the sleep mode time longer than required.

When the viewer falls asleep before the set sleep mode time is reached, the TV may be undesirably kept on for a long period of time, resulting in waste of power and shortening of durability as well.

In addition, since power is to be automatically turned off when a set sleep mode time is reached, when the viewer wishes to continue watching TV past the set sleep mode time, the viewer has a little inconvenience of turning on again the turned off TV after the set sleep mode time has expired.

SUMMARY OF THE INVENTION

Accordingly, it is an object of the present invention to provide a method of checking sleep mode in a TV which is capable of effectively reducing the unnecessary consumption of power by automatically turning off a TV when there is no response received to a periodical message prompting a viewer's continued viewing when a set sleep mode time is reached.

To achieve the above object, there is provided a method which includes a first step for confirming a set sleep mode time, a second step for outputting an on screen message for checking a viewer's continued viewing at a predetermined period when a set sleep mode time is reached, and a third step for turning off power when there is no response to the periodic message for checking a viewer's continued viewing.

DETAILED DESCRIPTION OF THE PREFERRED EMBODIMENTS

Figure 1:
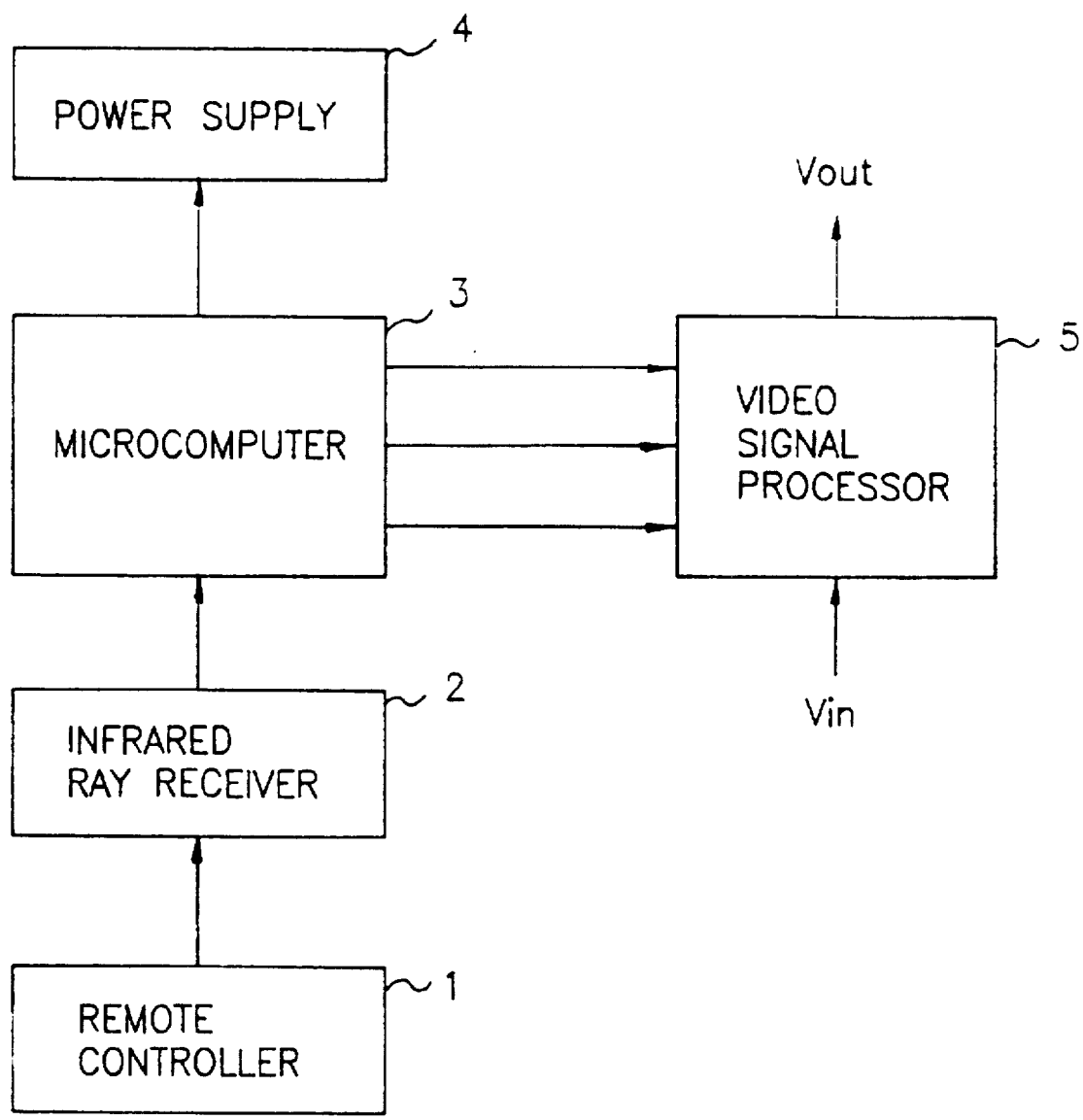
FIG. 1 is a schematic block diagram of a VCR according to the present invention.

FIG. 1 is a schematic block diagram of a VCR according to the present invention which includes a remote controller 1 for inputting various control functions/commands and a sleep mode function for operating a TV and the like through key input signals, an infrared ray receiver 2 for receiving an infrared rays signal, a microcomputer 3 for controlling the operation of each element of the VCR or setting a set sleep mode time by receiving a key input signal through the infrared ray receiver 2, confirming a viewer's continued viewing and controlling power, a power supply 4 for supplying each element of the VCR with power in accordance with the control of the microcomputer 3, and a video signal processor 5 for processing an inputted video signal $V_{in}$ and displaying the processed video signal on the screen.

The operation of the VCR according to the present invention will be described with reference to FIGS. 1 and 2.

When a viewer pushes a power key of the remote controller 1, an infrared ray signal is thereby outputted from the remote controller 1 and is inputted to the microcomputer 3 through the infrared ray receiver 2, and then the microcomputer 3 operates the power supply 4 and turns the VCR on in accordance with the inputted signal.

Here, when a picture receiver is set in a VCR mode, a video signal of a channel selected in the VCR's tuner (not illustrated) is displayed on the screen of a color picture tube (CPT) through the video signal processor 5, and thereby a viewer is able to watch a broadcast program of a channel he wants by using a channel key.

In addition, when a viewer pushes a play key of the remote controller 1 so as to watch a recorded program, the microcomputer 3 receives a play key signal, and operates a deck unit (not illustrated), and thereby a program recorded on a tape of the deck unit is supplied to the CPT through the video signal processor 5, and then a viewer can watch the program.

When a viewer watches a broadcast program or a recorded program late at night, a viewer may set a sleep mode time with a sleep mode key of the remote controller 1 so that a viewer may fall asleep while watching the program.

First when setting a sleep mode time, a sleep mode key signal outputted from the remote controller 1 is inputted to the microcomputer 3 through the infrared ray receiver 2, and the microcomputer 3 controls the video signal processor 5 in accordance with the sleep mode key signal, and thereby a thusly set sleep mode time (for example, 120 minutes) is displayed on the screen.

Whenever a sleep mode key signal is inputted, the microcomputer 3 decreases the sleep mode time by a predetermined amount (for example 10 mins) and updates the current remaining time which is then displayed on the screen (for example 120 mins→110 mins→100 mins→ 90 mins→ . . . →10 mins).

When the time remaining until the TV is to be turned off is displayed on the screen, and the viewer does not input a further sleep mode key signal within a predetermined time, the microcomputer 3 sets the displayed time as the sleep mode time.

That is, when the remaining time of 120 minutes until the TV is to be turned off is displayed on the screen, and a further sleep mode key signal is not inputted by the viewer, the microcomputer 3 recognizes the currently displayed time on the screen as the time when the TV is to be turned off. Afterwards, when, after 6 times of inputting a sleep mode key signal, 60 minutes is displayed on the screen as an updated time when the TV is to be turned off, and a further sleep mode key signal is not inputted within a predetermined time, the sleep mode time is set at 60 minutes.

Figure 2:
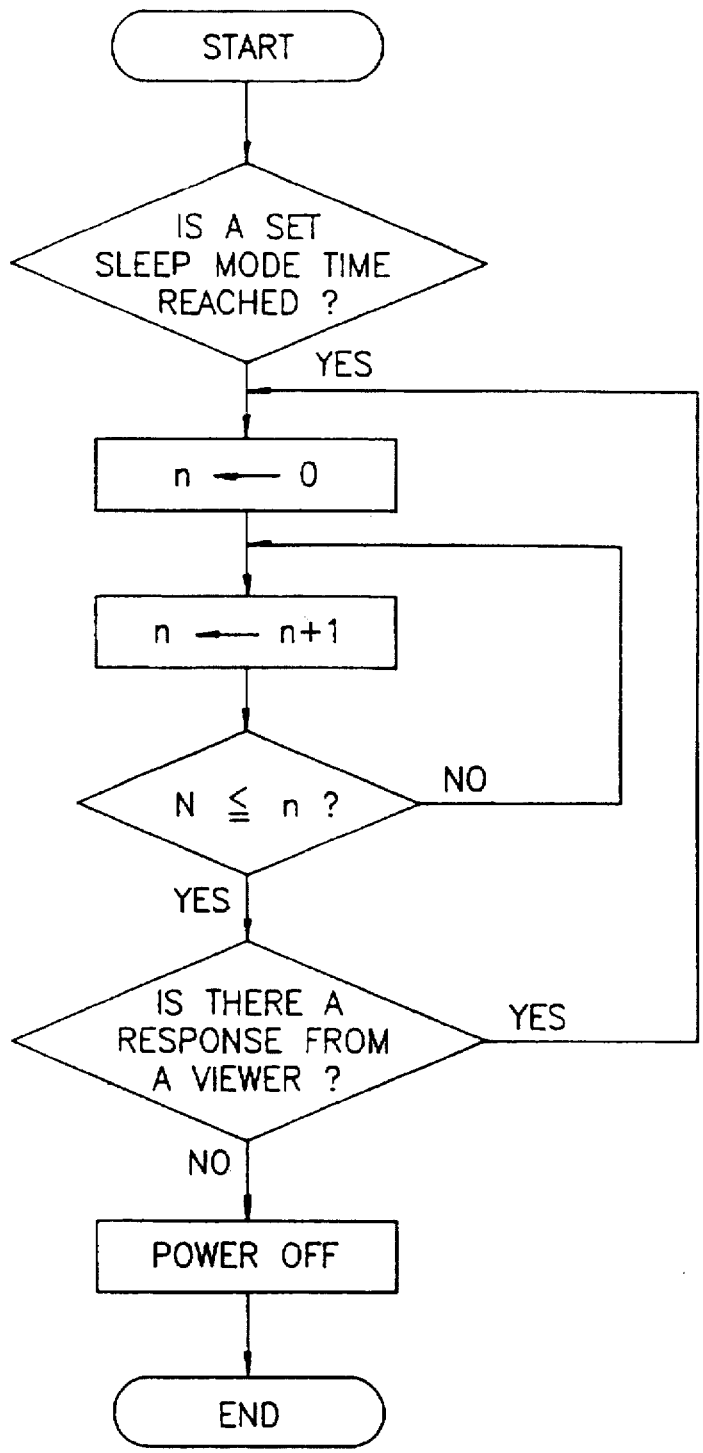
FIG. 2 is a flow chart of a method of checking a sleep mode in a TV according to the present inventions.

Afterwards, when the set sleep mode time is reached, as shown in FIG. 2, the microcomputer 3 counts a predetermined period of remaining time displayed on the screen, and displays a message on the screen to confirm a viewer's continued viewing at every predetermined period.

At this time, when a viewer falls asleep and cannot give a response to the message, the microcomputer 3 judges that the viewer has fallen asleep, and turns off the power by controlling the power supply 4.

However, when a viewer does not fall asleep before the predetermined time displayed on the screen, and gives a response to the message by using a key input or the set key of the remote controller 1, the microcomputer 3 recognizes the outputted key input signal, and controls the power supply 4, thereby lengthening a power-on time period by a predetermined time.

Afterwards, the microcomputer 3 repeatedly displays a message on the screen at every predetermined time, and continues to confirm the viewer's continued viewing.

For example, when the viewer has set a sleep mode time at 60 minutes at 10 o'clock p.m., and a message output period is set at 10 minutes, the microcomputer 3 starts to display a message on the screen for confirming the viewer's continued viewing from 11:10 p.m. and confirms the viewer's continued viewing every ten minutes.

However, when a viewer falls asleep at 11 o'clock p.m. and does not respond to the prompting message outputted from the microcomputer 3 and displayed on the screen, the microcomputer 3 judges that the viewer has fallen asleep, and turns off the power at 11:10 p.m.

But when the viewer has not fallen asleep until 11 o'clock p.m., and responds to the prompting message outputted from the microcomputer 3, the microcomputer 3 controls the power supply 4, keeps the power on, and displays a prompting message every ten minutes thereafter for confirming the viewer's continued viewing.

In another embodiment of the present invention, the microcomputer may output a message for confirming a viewer's continued viewing from a predetermined time before the set sleep mode time is reached, and not from the set sleep mode time.

As described in detail above, when the set sleep mode time is reached, the present invention displays a message on the screen for confirming a viewer's continued viewing at predetermined intervals, and turns off the power when there is no response from the viewer to thus have an effect of preventing waste of power and shortening of durability caused by an unnecessary operation of a TV and the like.

In addition, since when a sleep mode time is reached a message for confirming a viewer's continued viewing is automatically displayed on the screen, the viewer will make it a habit to set the sleep mode time at a short duration so that power consumption is decreased even if the viewer falls asleep before the lapse of the set sleep mode time.

What is claimed is:

1. A method of checking a sleep mode function in a TV, comprising the steps of:

a first step of confirming whether a set sleep mode time has been reached or not;

a second step of displaying a message continuously on a screen for confirming a viewer's continued viewing throughout every predetermined time interval, when the set sleep mode time is reached;

a third step of confirming whether a response to the message has been received from the viewer;

a fourth step of repeating the second and third steps when a response to the message is received from the viewer; and a fifth step of turning off the TV when a response to the message is not received from the viewer during the predetermined time interval.

2. The method of claim 1, wherein said sleep mode time is decreased by a predetermined amount whenever a sleep mode time signal is inputted by the viewer.

3. The method of claim 1, wherein the confirming of the viewer's response to the message is made by confirming and determining receipt of a key input signal.

4. The method of claim 1, wherein the displaying of the message for confirming the viewer's continued viewing is performed when the set sleep mode time is reached.

* * * * *